US012777428B2

(12) United States Patent
Asterjadhi et al.

(10) Patent No.: US 12,777,428 B2
(45) Date of Patent: Oct. 27, 2026

(54) DYNAMIC TRANSMIT POWER CONTROL

(71) Applicant: QUALCOMM Incorporated, San Diego, CA (US)

(72) Inventors: Alfred Asterjadhi, San Diego, CA (US); Gaurang Naik, San Diego, CA (US); George Cherian, San Diego, CA (US); Abhishek Pramod Patil, San Diego, CA (US); Sai Yiu Duncan Ho, San Diego, CA (US); Youhan Kim, Saratoga, CA (US); Guido Robert Frederiks, Watsonville, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 18/503,943

(22) Filed: Nov. 7, 2023

(65) Prior Publication Data

US 2025/0150978 A1 May 8, 2025

(51) Int. Cl.
*H04W 52/24* (2009.01)
*H04W 52/26* (2009.01)
*H04W 52/36* (2009.01)

(52) U.S. Cl.
CPC ......... *H04W 52/242* (2013.01); *H04W 52/26* (2013.01); *H04W 52/367* (2013.01)

(58) Field of Classification Search
CPC . H04W 52/242; H04W 52/26; H04W 52/367; H04W 52/50
See application file for complete search history.

(56) References Cited

U.S. PATENT DOCUMENTS

2015/0319700 A1* 11/2015 Oteri ..................... H04W 24/10 455/127.1
2019/0101620 A1* 4/2019 Reis ..................... G01S 5/0205
2023/0413320 A1* 12/2023 Singh ................ H04W 74/0875

OTHER PUBLICATIONS

Partial International Search Report—PCT/US2024/048014—ISA/EPO—Dec. 12, 2024.
International Search Report and Written Opinion—PCT/US2024/048014—ISA/EPO—Feb. 3, 2025.

* cited by examiner

*Primary Examiner* — John J Lee
(74) *Attorney, Agent, or Firm* — Holland & Hart LLP

(57) ABSTRACT

This disclosure provides methods, components, devices and systems for dynamic transmit power control. Some aspects more specifically relate to dynamically enable transmit power during a transmission opportunity (TxOP) to minimize the transmit power being used for message transmissions. In some implementations, a wireless device may transmit, at a first transmit power, a first message that indicates that the wireless device will transmit one or more second messages during a TxOP. The wireless device may select a second transmit power for the second message(s) and a plurality of transmission parameters, wherein the second transmit power satisfies a metric for the one or more second messages. The wireless device may transmit the second message(s) during the TxOP at the second transmit power and in accordance with respective values of the plurality of transmission parameters.

29 Claims, 9 Drawing Sheets

DYNAMIC TRANSMIT POWER CONTROL

TECHNICAL FIELD

This disclosure relates to wireless communication and, more specifically, to dynamic transmit power control.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Wireless networks may adopt various schemes to minimize power consumption by wireless devices. For example, AP power save operations may be supported within the wireless networks to minimize the amount of power the AP (such as a mobile AP) consumes during wireless communications. Similar or other techniques may be applied to the STAs operating within the wireless network. Minimization of power consumption may improve battery performance, such as prolonging battery life, for mobile wireless devices, reduce device cost, as well as reducing operating costs and burdens on device operators.

To support such wireless communications, various transmission parameters may be optimized for wireless transmissions. For example, a transmitting device may select the modulation and coding scheme, the bandwidth, the number of spatial streams, and other transmission parameters, for the wireless transmission. Generally, these transmission parameters may be selected to maximize the data rate (throughput) of the wireless network using a maximum available transmit power level. Generally, the maximum available transmit power level is set or otherwise controlled by the wireless network based on a maximum allowable energy that can be communicated over the wireless medium.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications by a wireless device. The method may include transmitting, at a first transmit power, a first message that indicates that the wireless device will transmit one or more second messages during a transmission opportunity and transmitting the one or more second messages during the transmission opportunity at a second transmit power and in accordance with respective values of a set of multiple transmission parameters, where the second transmit power satisfies a metric for the one or more second messages.

Another innovative aspect of the subject matter described in this disclosure can be implemented in a wireless device for wireless communications. The wireless device may include a processing system that includes processor circuitry and memory circuitry that stores code. The processing system may be configured to cause the wireless device to transmit, at a first transmit power, a first message that indicates that the wireless device will transmit one or more second messages during a transmission opportunity and transmit the one or more second messages during the transmission opportunity at a second transmit power and in accordance with respective values of a set of multiple transmission parameters, where the second transmit power satisfies a metric for the one or more second messages.

Another innovative aspect of the subject matter described in this disclosure can be implemented in a wireless device for wireless communications. The wireless device may include means for transmitting, at a first transmit power, a first message that indicates that the wireless device will transmit one or more second messages during a transmission opportunity and means for transmitting the one or more second messages during the transmission opportunity at a second transmit power and in accordance with respective values of a set of multiple transmission parameters, where the second transmit power satisfies a metric for the one or more second messages.

Another innovative aspect of the subject matter described in this disclosure can be implemented in a non-transitory computer-readable medium storing code for wireless communications. The code may include instructions executable by a processor to transmit, at a first transmit power, a first message that indicates that the wireless device will transmit one or more second messages during a transmission opportunity and transmit the one or more second messages during the transmission opportunity at a second transmit power and in accordance with respective values of a set of multiple transmission parameters, where the second transmit power satisfies a metric for the one or more second messages.

Some examples of the method, wireless devices, and non-transitory computer-readable medium described herein may further include operations, features, means, or instructions for selecting the second transmit power for the one or more second messages and the set of multiple transmission parameters, selecting optimized values for one or more of the set of multiple transmission parameters, where the optimized values may be in accordance with a wireless channel availability and an operating mode or capability of a receiving device for which the one or more second messages may be intended, and selecting the second transmit power after selection of the optimized values.

Some examples of the method, wireless devices, and non-transitory computer-readable medium described herein may further include operations, features, means, or instructions for selecting the second transmit power for the one or more second messages and the set of multiple transmission parameters and selecting optimized values for a combination of one or more of the set of multiple transmission parameters and the second transmit power, where the optimized values may be optimized with respect to one or more of a minimum energy consumption, a spatial reuse opportunity, and protection of the transmission opportunity.

Some examples of the method, wireless devices, and non-transitory computer-readable medium described herein may further include operations, features, means, or instructions for selecting the second transmit power for the one or more second messages and the set of multiple transmission parameters, determining a minimum second transmit power in accordance with an energy consumption metric and the respective values of the set of multiple transmission parameters, and selecting the second transmit power in accordance with the minimum second transmit power and a delta value.

Some examples of the method, wireless devices, and non-transitory computer-readable medium described herein may further include operations, features, means, or instructions for selecting the second transmit power for the one or more second messages and the set of multiple transmission parameters and selecting the second transmit power in accordance with a pathloss value for a channel between the wireless device and a receiving device that may be to receive the one or more second messages.

In some examples of the method, wireless devices, and non-transitory computer-readable medium described herein, the first transmit power may be greater than the second transmit power.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
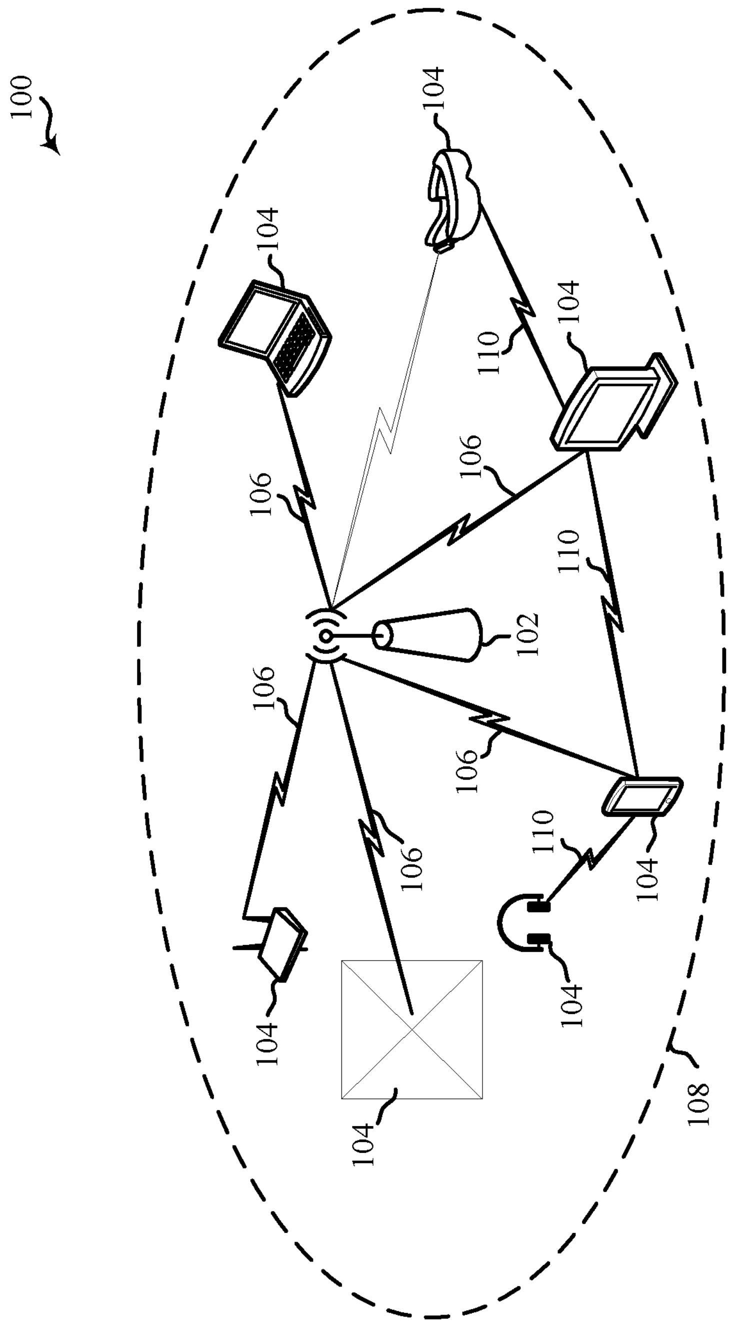
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Wireless devices generally apply various transmission parameters to configure and transmit wireless signals. These transmissions propagate across a wireless medium that, to some degree, impacts the wireless signals, such as by degrading the signal, shifting the signal, or other interference. Such interactions are generally described as the pathloss of the wireless medium and may be measured or otherwise determined as interference levels, receive signal strength, throughput levels, and the like. To address this, wireless devices select and apply the transmission parameters that are designed to overcome at least in part, these degrading components of the wireless medium, to ensure receipt of the wireless signals. However, the power level that the devices transmit the wireless signals at (e.g., the transmit power) is generally either fixed or otherwise configured by the network based on fixed standards or other regulatory considerations. This approach may waste resources, such as power and transmission opportunities, such as when the transmitting device is located near the receiver or otherwise has an optimal wireless medium available.

Various aspects relate generally to dynamic transmit power control operations at a wireless device. Some aspects more specifically relate to enabling dynamic transmit power control at a transmitting device and, in some implementations, at a receiving device. In some implementations, a wireless device (a transmitting device, such as a STA, a mobile AP, or other untethered or mobile wireless device) may capture a channel for a transmission opportunity (TxOP). The wireless device may perform a channel clearance procedure to sense the channel for a particular duration. If the channel is determined to be available, the transmitting device may transmit a first message that indicates an upcoming data transmission(s) (one or more second messages) during the TxOP. The first message may serve to reserve the channel, such as by carrying or otherwise conveying an indication that the channel will be used for wireless communications during the TxOP.

The first message may be transmitted at a first transmit power, such as the maximum available transmit power. The maximum available transmit power may generally refer to the maximum transmit power the transmitting device can use for the first message transmission that is within compliance with applicable guidance and regulations. Transmitting the first message at the maximum available transmit power may improve reliability of the first message to ensure that the receiving device is prepared to respond and participate in the wireless communications during the TxOP. Additionally, transmitting the first message at the maximum available transmit power may maximize the transmission range of the first message. In some implementations, the first message may be a request-to-send (RTS) message transmitted at the beginning of the TxOP. Additionally, or alternatively, the first message may be any of other control frame, such as BlockAckReq, any variant of a Trigger frame (e.g., MU RTS Trigger frame), etc. In some implementations, the first message may be sent in a non-HT (duplicate) PPDU so that the frame may be decoded by all third party STAs that are within range of the transmitter, since non-HT (duplicate) PPDUs are required to be decoded by all legacy STAs, and the PSDUs in a non-HT duplicate PPDUs are duplicated over multiple 20 MHz subchannels of the BW of the PPDU, which in turn may improve reliability of the PPDU.

The wireless device may then select a second transmit power for the one or more second messages based on the transmission parameters (modulation and coding scheme, available bandwidth, PPDU type, use of LDPC, use of midambles, duplication mode, preamble puncturing, guard intervals, and others), as well as at the second transmit power. In some implementations, the second transmit power may be based on an energy consumption metric that generally indicates the lowest or minimum transmit power that the second message(s) can be transmitted at to achieve a metric. That is, the wireless device may, in addition to the other transmission parameters, use a transmit power for the second message(s) that is the minimal amount of transmit power the device can use and still achieve a sufficiently reliable transmission. The second transmit power may be selected as the minimum amount of transmit power that can be used to reliably communicate the second message(s) across the wireless medium. Accordingly, the performance of the wireless medium may be used in selecting the second transmit power. For example, wireless devices that are located close to each other may be able to perform wireless communications at a lower transmit power than wireless devices that are located farther apart. In some implementations, the second transmit power may be based on the type of TxOP, such as a NAV-protected TxOP or a spatial reuse TxOP.

The second transmit power may be selected according to different techniques. One non-limiting technique may be that the transmitting device selects for the highest available (optimizes) the transmission parameters, such as the coding scheme, the bandwidth, and other parameters so that the duration of the PDU that carries the second message is the smallest possible among other things. The second transmit power can then be selected such that the second message(s) may be transmitted with a sufficient amount of reliability given the previously selected transmission parameters. Another technique may be that the transmitting device initially optimizes for the transmission parameters as well as for the second transmit power. That is, in this second approach the second transmit power is optimized in conjunction with the other transmission parameters rather than afterwards. Both techniques may limit the amount of wireless signals propagated into the wireless medium by the transmitting device.

The wireless device may transmit the second message(s) during the TxOP and at the second transmit power. For example, the second message(s) may include data messages, such as protocol data unit (PDU) data being communicated during the TxOP. In some implementations, the TxOP may include one or more messages being transmitted from the transmitting device (the TxOP holder) to the receiving device (the TxOP responder) and one or more messages being transmitted from the receiving device to the transmitting device. The receiving device may select a transmit power for its message transmissions during the TxOP based on the second transmit power. That is, both transmitting and receiving devices may minimize the transmit power of the PDU messages exchanged during the TxOP in order to minimize the amount of wireless signals transmitted into the wireless medium. In some implementations, the transmitting device may transmit a first portion (such as the header) of the second message(s) at the maximum available transmit power and then transmit the remaining portions of the second message(s) at the second transmit power.

The receiving device may, upon the completion of the PDU exchange, transmit an acknowledgment message to the transmitting device. The acknowledgement message may confirm which of the one or more data packets (MPDUs) contained in the PDU have been successfully received. The acknowledgement message may be one or both of an ACK frame or a block ACK frame. The ACK frame may indicate information acknowledging or otherwise confirming receipt of the PDU. The ACK frame may be a block ACK frame indicating the status of PDU(s) (such as indicating a "1" for successful receipt or a "0" for failure) of each PDU within an aggregate PDU through a bitmap. The acknowledgement message may be transmitted at the maximum available transmit power.

Particular aspects of the subject matter described in this disclosure can be implemented to realize one or more of the following potential advantages. In some implementations, dynamic transmit power control may enable minimization of wireless radiation within the wireless network. Selecting the lowest transmit power that ensures successful PDU delivery may support successful delivery of the PDU with a certain reliability, such as a target packet error rate. The described techniques may provide for wireless devices located near each other to exchange data during the TxOP at a lower transmit power than the transmit power that would be used for wireless devices located farther apart from each other. Transmitting the first message (and a response to the first message) at the maximum available transmit power may enable the wireless devices to better estimate the channel conditions, among other things, such as maximum coverage to improve mobility, reduce false roaming conditions, improve NAV protection, which may improve second transmit power selection by the wireless devices.

Transmitting the first portion of the second message(s) at the maximum transmit power, in some implementations, or at the second transmit power may enable NAV protection of the TxOP and may improve spatial reuse within the TxOP. The described techniques can be used to avoid resource waste by minimizing interference introduced into the wireless environment associated with excess wireless signals. The described techniques may improve TxOP management by enabling dynamic transmit power control to protect the network allocation vector (NAV) of the TxOP as well as to provide spatial reuse protection.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the WLAN wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple subbands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

Figure 2:
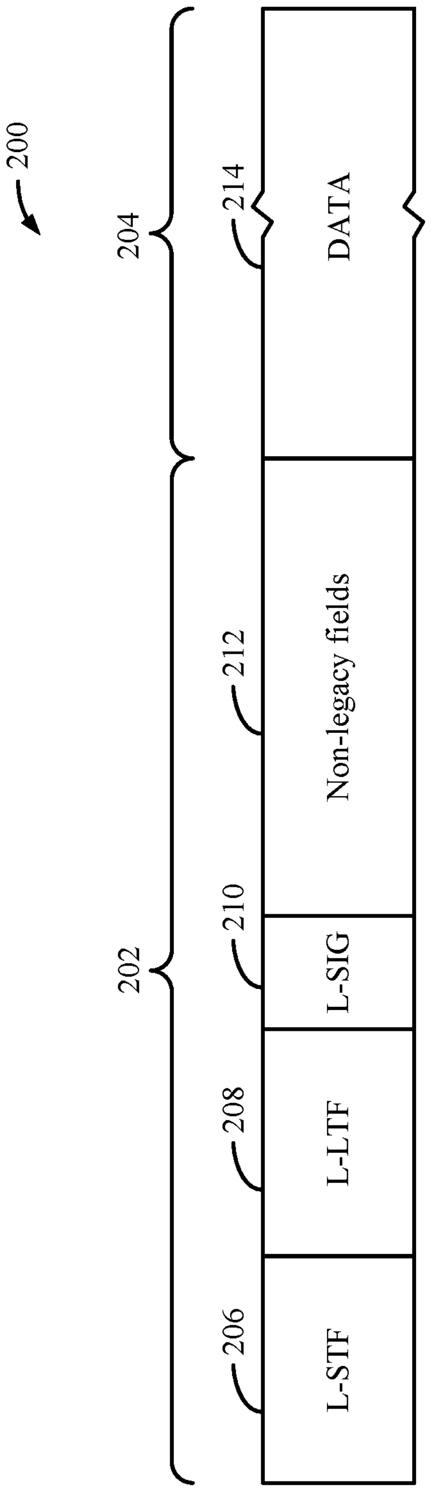
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
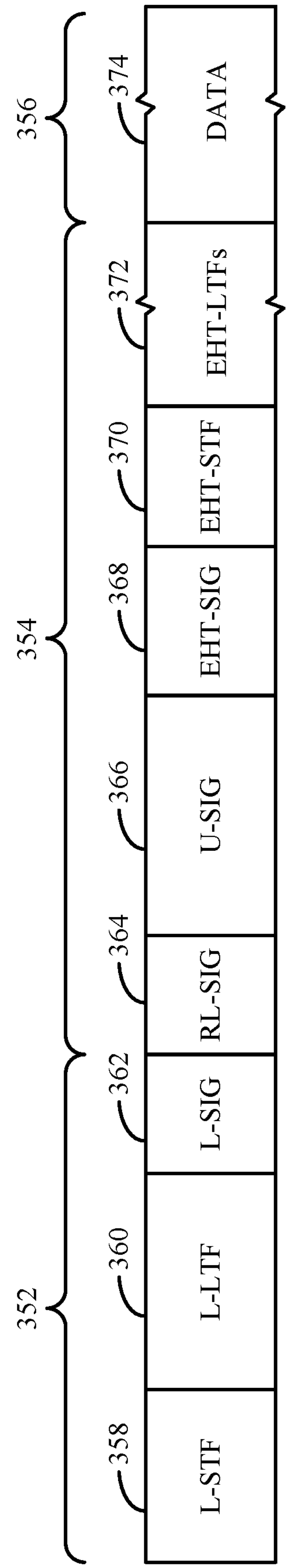
FIG. 3 shows an example physical layer (PHY) protocol data unit (PPDU) usable for communications between a wireless AP and one or more wireless STAs.

FIG. 3 shows an example physical layer (PHY) protocol data unit (PPDU) 350 usable for communications between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT—or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as the AP 102 or the STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink (UL) or downlink (DL) resources for them. EHT-SIG 368 may be decoded by each compatible STA 104 served by the AP 102. EHT-SIG 368 may generally be used by the receiving device to interpret bits in the data field 374. For example, EHT-SIG 368 may include resource unit (RU) allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Figure 4:
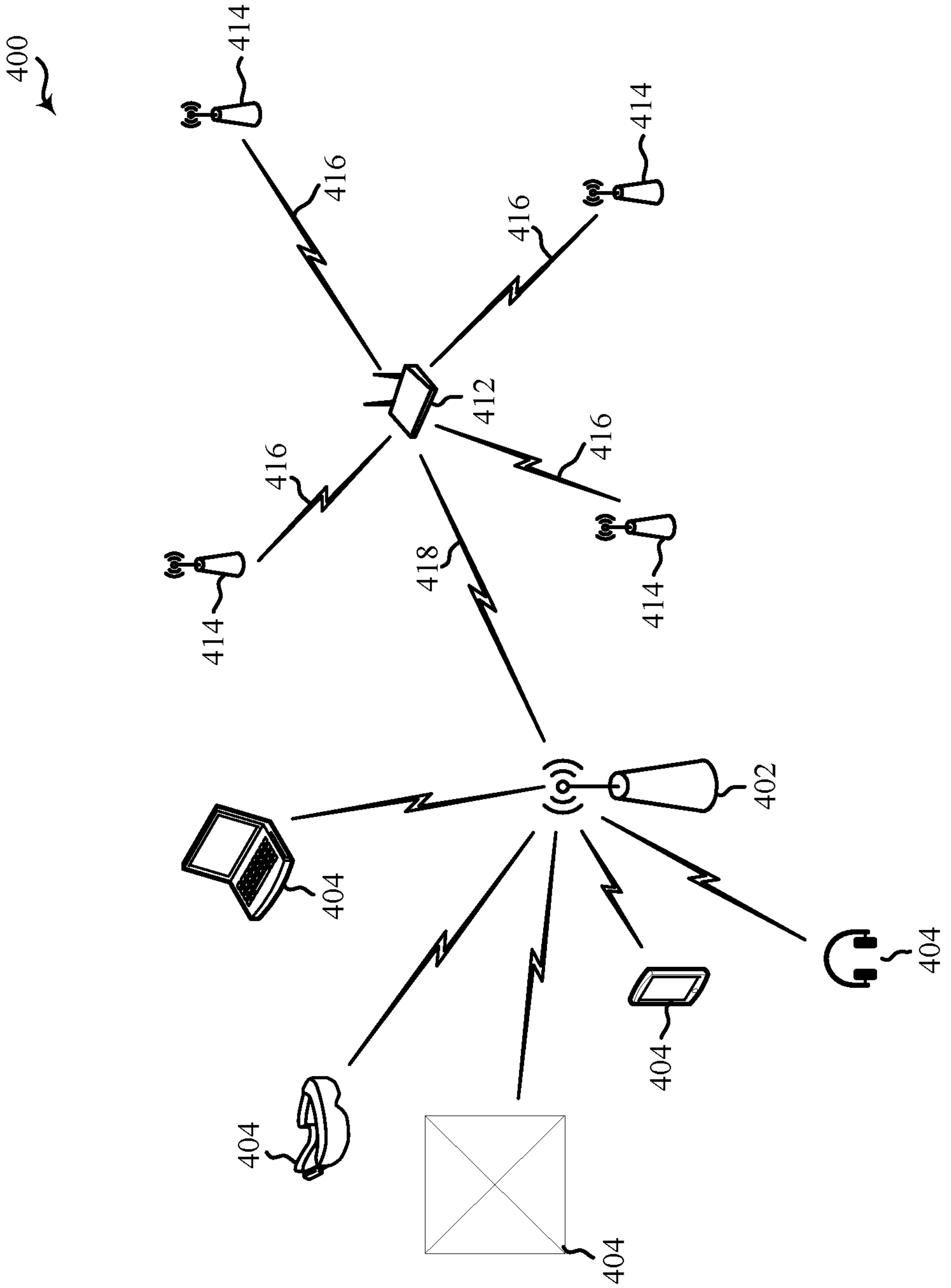
FIG. 4 shows a pictorial diagram of another example wireless communication network.

FIG. 4 shows a pictorial diagram of another example wireless communication network 400. According to some aspects, the wireless communication network 400 can be an example of a mesh network, an IoT network or a sensor network in accordance with one or more of the IEEE 802.11 family of wireless communication protocol standards (including the 802.11ah amendment). The wireless network 400 may include multiple wireless communication devices 414. The wireless communication devices 414 may represent various devices such as display devices (for example, TVs, computer monitors, navigation systems, among others), music or other audio or stereo devices, remote control devices ("remotes"), printers, kitchen or other household appliances, among other examples.

In some implementations, the wireless communication devices 414 sense, measure, collect or otherwise obtain and process data and then transmit such raw or processed data to an intermediate device 412 for subsequent processing or distribution. Additionally, or alternatively, the intermediate device 412 may transmit control information, digital content (for example, audio or video data), configuration information or other instructions to the wireless communication devices 414. The intermediate device 412 and the wireless communication devices 414 can communicate with one another via wireless communication links 416. In some implementations, the wireless communication links 416 include Bluetooth links or other PAN or short-range communication links.

In some implementations, the intermediate device 412 also may be configured for wireless communication with other networks such as with a Wi-Fi wireless communication network 100 or a wireless (for example, cellular) wide area network (WWAN), which may, in turn, provide access to external networks including the Internet. For example, the intermediate device 412 may associate and communicate, over a Wi-Fi link 418, with an AP 102 of a WLAN network, which also may serve various STAs 104. In some implementations, the intermediate device 412 is an example of a network gateway, for example, an IoT gateway. In such a manner, the intermediate device 412 may serve as an edge network bridge providing a Wi-Fi core backhaul for the IoT network including the wireless communication devices 414. In some implementations, the intermediate device 412 can analyze, preprocess and aggregate data received from the wireless communication devices 414 locally at the edge before transmitting it to other devices or external networks via the Wi-Fi link 418. The intermediate device 412 also can provide additional security for the IoT network and the data it transports.

Aspects of transmissions may vary according to a distance between a transmitter (for example, an AP 102 or a STA 104) and a receiver (for example, another AP 102 or STA 104). Wireless communication devices (such as the AP 102 or the STA 104) may generally benefit from having information regarding the location or proximities of the various STAs 104 within the coverage area. In some implementations, relevant distances may be determined (for example, calculated or computed) using RTT-based ranging procedures. Additionally, in some implementations, APs 102 and STAs 104 may perform ranging operations. Each ranging operation may involve an exchange of fine timing measurement (FTM) frames (such as those defined in the 802.11az amendment to the IEEE family of wireless communication protocol standards) to obtain measurements of RTT transmissions between the wireless communication devices.

Figure 5:
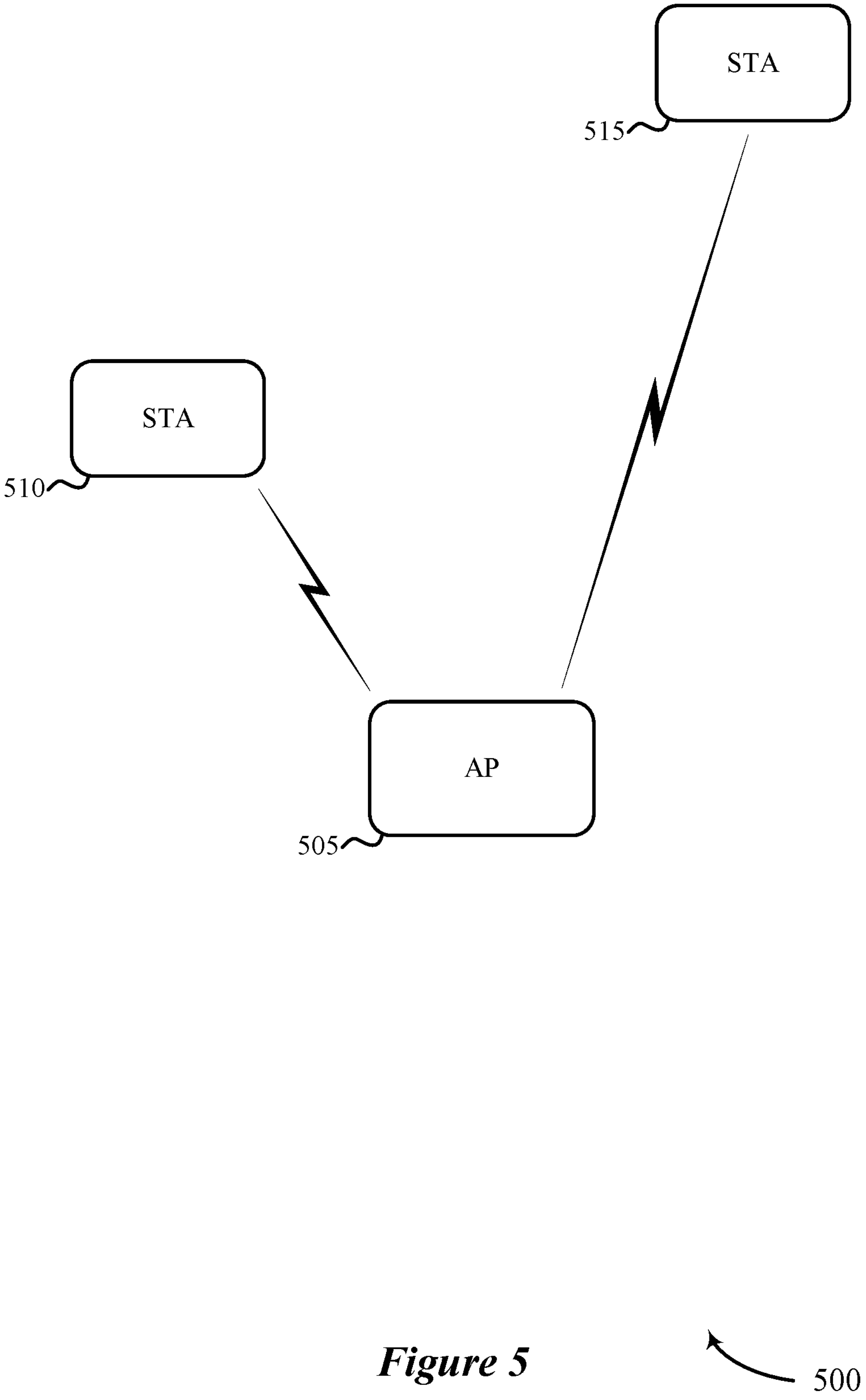
FIG. 5 shows an example of a wireless network that supports dynamic transmit power control.

FIG. 5 shows an example of a wireless network 500 that supports dynamic transmit power control. Wireless network 500 may implement aspects of implement or be implemented by aspects of WLAN 100, as shown and described with reference to FIG. 1. For example, aspects of wireless network 500 may be implemented at or implemented by a wireless device, which may be implementations of the corresponding devices described herein, such as an AP 102 or a STA 104 described with reference to FIG. 1. In some aspects, wireless network 500 may include an AP 505, a STA 510, and a STA 515, which may be implementations of the corresponding devices described herein. For example, the AP 505 may be an example of a mobile AP. The AP 505, the STA 510, and the STA 515 may be referred to herein as a wireless device, such as a transmitting device or a receiving device supporting dynamic transmit power control.

Wireless network 500 may support AP power saving operations to reduce AP power consumption. Such techniques may support improved P2P operations, such as between STAs, between mobile APs, or between a STA and a mobile AP. These power saving operations prolong battery life of untethered devices (non-AP STA(s) and mobile AP(s)), reduce device cost, and reduce energy bills.

Wireless devices use a number of transmission parameters to configure message exchanges. Examples of the transmission parameters include, but are not limited to, the bandwidth, the receive signal strength, the number of spatial streams, the MCS index, the PPDU type, a preamble puncturing mode, a coding scheme, a Doppler value, or a guard interval, available for the wireless communications. In some wireless networks, the wireless devices optimize such transmission parameters to improve the data rate. For example, the transmitting device will select a given MCS or other parameter that optimizes for the data rate available for the wireless communications.

However, in such networks the transmit power is generally capped at a maximum available transmit power. For example, the maximum available transmit power may be defined by regulatory bodies, may be based on a managing AP or by a third party entity that sets such maximum values depending on the location of the AP, the STAs associated with the AP, or both. This technique does not consider or are otherwise independent of the location (physical separation) of the wireless devices or the channel conditions between the devices. As is shown in FIG. 5, the AP 505 and the STA 510 are located closer to each other than the STA 515. This may result in a better channel condition between the AP 505 and the STA 510 than between the AP 505 and the STA 515, for example. Defaulting to the maximum available transmit power for communications between the AP 505 and the STA 510 may result in such wireless devices transmitting or otherwise propagating a signal onto the wireless medium at the maximum available transmit power, thus introducing interference into the medium and wasting device resources.

Accordingly, aspects of the described techniques enable dynamic transmit power control by wireless devices. Dynamic transmit power control generally optimizes the transmit power for transmissions along with other transmission parameters to minimize the energy consumption (for power saving operations). This may include a wireless device transmitting or otherwise providing a first message at a first transmit power. The first message may carry or otherwise indicate that the wireless device will transmit one or more second messages during a TxOP.

For example, the wireless device may capture the channel using a channel access procedure and transmit the first message to reserve or hold the channel for the duration of the TxOP. The first message may be an initial control frame having a first known initial transmit power ($ITP_R$). The device receiving the first message (a receiving device) may respond with a control response frame having a second known initial transmit power ($ITP_C$). The first and second known initial transmit powers may be known (previously exchanged) between the wireless devices. In some implementations, the initial control frame/control response frame exchange may be a (multi-user (MU)-) RTS/CTS frame exchange. In some implementations the initial control frame and the control response frame may include a field that provides the transmit power being used for transmitting the frame. In some implementations the frames may include a field, from the value of which one can derive the transmit power being used for that frame.

In some implementations, the initial control frame and the control response frame exchange may be used be one or both wireless devices to measure or otherwise determine a pathloss value for the wireless channel. For example, the first known initial transmit power ($ITP_R$) may be used by the receiving device to estimate an initial SINR between the receiving device and the transmitting device (that, the along with the $ITP_R$, can be used to compute the pathloss value). The second known initial transmit power ($ITP_C$) may be used by the receiving device to estimate the initial SINR between the transmitting device and the receiving device.

Accordingly, the second wireless device may select a second transmit power ($ITP_S$) to use for transmitting the second message(s) along with the other transmission parameters. Broadly, the second transmit power may be selected such that it satisfies a metric, such as threshold power consumption metric. Different techniques may be applied when selecting the second transmit power.

A first approach may be that the wireless device optimizes the other transmission parameters first (bandwidth, MCS, etc.) and then optimizes the second transmit power to minimize power consumption. For example, the wireless device may, before selecting the second transmit power, select optimized values one, some, or all of the plurality of transmission parameters. This may include the wireless device optimizing the other transmission parameters based on the wireless channel availability as well the operating mode or capability of the receiving device.

The wireless device may then (after optimizing the other transmission parameters) select the second transmit power according to the metric. Broadly, the metric may correspond to the lowest transmit power that ensures successful PPDU delivery of the second message(s) to the receiving device(s). For example, the metric used to select the second transmit power may ensure successful deliver of the PPDU (the second message(s)), such as by ensuring a threshold reliability metric. The threshold reliability metric may be based on any number of targets, such as a target packet error rate, a target energy consumption, a spatial reuse opportunity, a transmit opportunity protection, or other targets, alone or in any combination.

A second approach may be that the wireless device optimizes the second transmit power along with the other transmission parameters. For example, the wireless device may select values for the MCS, the bandwidth, the PPDU type, the second transmit power, and other parameters, according to the metric. That is, the wireless device may select optimized values for a combination of the plurality of transmission parameters and the second transmit power in a manner that satisfies the metric and minimizes energy consumption.

As discussed above, selecting the second transmit power may be based on the estimated SINR of the channel (the pathloss value) between the transmitting device and the receiving device. As one example, the initial SINR may be based on an initial control frame/control response frame exchange performed between the transmitting device and the receiving device. For example, the initial frame exchange may precede the active transmit power periods (the period of time that the dynamic transmit power control is implemented, such as during all of the TxOP, or a certain number of TxOPs). Additionally, or alternatively, the initial SINR, where the SINR is equal to the receive power/(interference+noise). The pathloss value, which may correspond to the 20 log component from Friis Formula $$P_r^{[dB]} = P_t^{[dB]} + G_t^{[dBi]} + G_r^{[dBi]} + 20\log_{10}\left(\frac{\lambda}{4\pi d}\right),$$

may be based on sounding procedure performed between the transmitting device and the receiving device. Additionally, or alternatively, the initial SINR (the pathloss value) may be based on the distance between the transmitting device and the receiving device. Additionally, or alternatively, the initial SINR (the pathloss value) may be based on a previous message exchange (previous data communications or other message exchanges) with the receiving device. Accordingly, the pathloss value (the initial SINR) may be measured by the transmitting device, by the receiving device, or by both devices.

In some aspects, the second transmit power ($ITP_S$) may be selected to account for a delta value. Broadly, the delta value may provide for improved robustness of the second message (s) transmission. That is, the delta value may provide for a slight increase (the, or based on the, delta value) in the second transmit power to increase the reliability metric for the second messages. In some implementations, the delta value may be signaled to the transmitting device (from an AP) or may be selected by the transmitting device (a mobile AP). The transmitting device may determine a minimum second transmit power in accordance with the energy consumption metric and the other transmission parameters, such as is discussed above, and then use the delta value to select the actual second transmit power to be used for transmission of the second message(s).

Accordingly, the transmitting device may select the second transmit power for transmitting the second message(s). The second transmit power may be less than the first transmit power. The first transmit power ($ITP_R$) used to transmit the first message may be, in some implementations, the first known initial transmit power, such as the maximum available transmit power. The second transmit power ($ITP_S$) may be a transmit power that is less or lower than the first transmit power (according to the energy consumption metric).

In some aspects, the value of the first known initial transmit power ($ITP_R$), the second known initial transmit power ($ITP_C$), or the second transmit power ($ITP_S$) may be defined or otherwise expressed in terms of a combined transmit power. The combined transmit power may be relative to or at a transmit antenna connector for one, some, or all of the antennas used by the wireless device to transmit the first message, such as in units of dBm/20 MHz channel. That is, the initial transmit powers may be subject to regulatory limits and may not exceed other limitations, such as those specified by an AP. For example, the initial transmit powers may collectively be less than a transmit power envelope elements or other elements.

Accordingly, the transmitting device may transmit the second message(s) during the TxOP at the second transmit power and in accordance with the respective values of the plurality of transmission parameters. In some implementations, the receiving device may transmit a response to the second message(s), such as an acknowledgment (ACK) message. The ACK message may be transmitted based on the first transmit power (at the maximum available transmit power), in some implementations.

The described dynamic transmit power control techniques may reduce the active power consumption of STAs or mobile APs while increasing spatial reuse opportunities whenever possible. The actual transmit powers (at least for certain control frames, such as control frame exchanges at the start of the TxOP, which may be referred to as the active power periods. The active power periods may be advertised in elements or in the control frames themselves. Definition and rules for the dynamic transmit power may be based on the type of TxOP for the second message(s).

It may be up to implementation of the transmitting device regarding selection of the maximum transmit power to be used for the control frames (for TxOP protection). The transmitting device may, based on its implementation, select the reduced transmit power level for the second transmit power for the rest of the active power period (to improve power savings).

Figure 6:
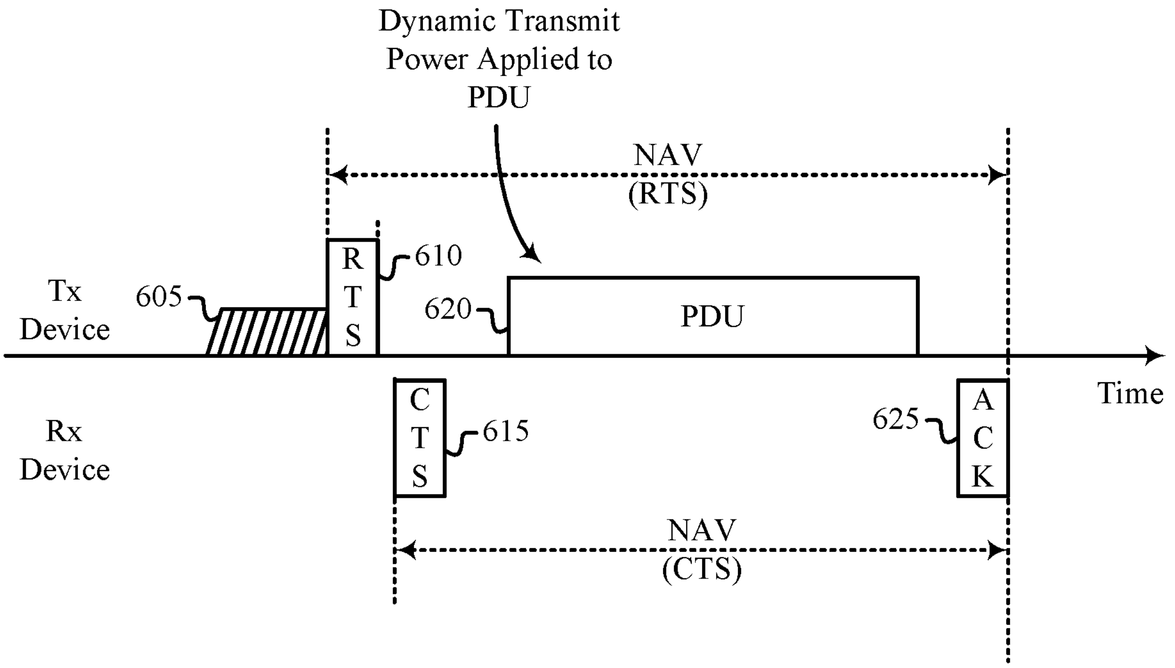
FIG. 6 shows an example of a signaling diagram that supports dynamic transmit power control.

FIG. 6 shows an example of a signaling diagram 600 that supports dynamic transmit power control. Signaling diagram 600 may implement aspects of implement or be implemented by aspects of WLAN 100, as shown and described with reference to FIG. 1. For example, aspects of signaling diagram 600 may be implemented at or implemented by a wireless device, which may be implementations of the corresponding devices described herein, such as an AP 102 or a STA 104 described with reference to FIG. 1. The AP(s) and STA(s) may be referred to herein as a wireless device, such as a transmitting device or a receiving device supporting dynamic transmit power control.

The transmitting device may contend for access to the channel by monitoring an energy level of the primary channel or by detecting an 802.11 signal preamble during one or more monitoring occasions 605. If the transmitting device determines that the channel is available, the transmitting device may transmit or otherwise provide a first message 610 on the channel indicating that the transmitting device has captured the channel for the TxOP and will transmit second message(s) during the TxOP. For example, the transmitting device may identify or otherwise determine that it has wireless communications to perform with a receiving device (such as a STA 104 discussed with reference to FIG. 1).

Accordingly, the first message 610 may carry or otherwise indicate resource allocation information for the TxOP on the channel. In some implementations, the first message 610 may be an initial control frame or other trigger frame. In some implementations, such as is shown in FIG. 6, the first message 610 may be an example of an RTS frame. The first message 610 may identify or otherwise indicate information for the resources associated with the TxOP. For example, the transmitting device may configure the first message 610 to identify the duration of the TxOP, to indicate a NAV for its communications with the receiving device, available frequency resources for the TxOP, or other allocation information supporting the TxOP. The first message may be sent in a non-high throughput (HT) duplicate PPDU format such that the receiving device may decode the PPDU on any channel within the bandwidth.

In some aspects, the transmitting device may transmit the first message 610 at the first transmit power (the $ITP_R$). The first transmit power may be, in some implementations, the maximum available transmit power.

The receiving device may transmit or otherwise provide a response 615 to the first message. The response 615 from the receiving device may be provided in a clear-to-send (CTS) frame. The response 615 may be carried or otherwise conveyed in a trigger-based PPDU, in some implementations. The response 615 from the receiving device may be provided on the channel associated with the TxOP.

In some implementations, the response 615 may be transmitted at a power level based on the first transmit power. The (MU-) RTS and CTS frame exchange may be performed at the known initial transmit power levels. For example, the response 615 to the first message 610 may be transmitted at the maximum available transmit power, such as the first transmit power. Providing the initial frame exchange messages at the maximum available transmit power may protect the NAV in the widest possible range, in some implementations. This may minimize the loss of connectivity due to mobility (avoid roaming induction due to dynamic transmit power operations).

The transmitting device may transmit the second message (s) 620 (e.g., PDU) to the receiving device according to the allocation information indicated in the first message. For example, the transmitting device may transmit data to the receiving device on the channel and during the TxOP.

Although the example discussed herein provides for the transmitting device to transmit the PDU to the receiving device, it is to be understood that the PDU session may include multiple messages exchanged between the transmitting device and the receiving device during the TxOP. The dynamic transmit power techniques discussed herein may be applied for the second message(s) 620 transmitted to the receiving device as well as being applied for one or more third messages transmitted by the receiving device to the transmitting device during the TxOP. That is, the receiving device may transmit the third message(s) to the transmitting device at a third transmit power that is based on the second transmit power. For example, the third transmit power may be the second transmit power or may otherwise be selected based on the second transmit power.

The receiving device may transmit or otherwise provide (and the transmitting device may receive or otherwise obtain) an ACK message 625 (an ACK frame) in response to transmitting the second message(s) 620. The ACK frame may indicate information acknowledging or otherwise confirming receipt of the PDU. The ACK frame may be a block ACK frame indicating the status of PDU(s) (such as indicating a "1" for successful receipt or a "0" for failure) of each PDU within an aggregate PDU through a bitmap. The ACK frame may be provided via the channel and during the TxOP. The ACK frame may confirm that the receiving device has successfully received and decoded the data (the second message(s)).

The transmitting device may select or otherwise determine the second transmit power to use when transmitting the second message(s) 620 according to the techniques described herein. For example, the second transmit power may be less than the first transmit power (a reduced transmit power that is less than the available transmit power). The second transmit power may be selected using a limited transmit power (based on an energy consumption metric) that is optimized after optimization of the other transmission parameters, as one example. The second transmit power may be selected using the limited transmit power that is optimized in combination with the other transmission parameters, in another example. In some implementations, information regarding the second transmit power may be advertised to receiving devices (via elements in the management frames exchanged between the transmitting and receiving devices). The information may be advertised in operation mode (notification) exchanges or within the (MU-) RTS/CTS frame exchange.

The second transmit power may be based on the pathloss value (the SINR) associated with the channel (the wireless medium between the transmitting device and the receiving device). The pathloss value may be based, in some aspects, on the location of the transmitting and receiving devices (the separation in the physical domain). The transmitting device may exchange frames with the receiving device at a lower transmit power at a first location (close together) than at a second location (farther apart) (using similar other transmission parameters). The pathloss value may be based on the location or based on the SINR, which may be impacted by the location between the devices.

The SINR estimation may be performed via the sounding procedure between the transmitting and receiving devices. The SINR estimation may be performed using the preceding control frame exchange (such as the (MU-) RTS/CTS frame exchange). The transmit power used for the RTS/CTS frame exchange ($ITP_R/ITP_C$) may be known by the transmitting and receiving devices (such as being previously coordinated). Accordingly, the second transmit power may be based on the first initial transmit power and the second initial transmit power. The RTS/CTS frame exchange may be performed the maximum available transmit power.

In some aspects, the PDU(s) sent after the (MU-) RTS/CTS frame exchange may be sent using or based on the lower transmit power (the second transmit power). However, in some implementations the ACK frame (a block ACK frame) sent in response to soliciting PDUs (control frames in general) may be sent at a higher transmit power.

In some implementations, selecting the transmit power of the initial portion (the PHY header) of the first PDU that follows the CTS may enable different protections. For example, transmitting the initial portion a the second transmit power may enable TxOPs with increased NAV protection (reduced spatial reuse). Transmitting the initial portion at the maximum available transmit power may enable TxOPs with increased spatial reuse opportunities. Accordingly, in some implementations the transmitting device may transmit a first portion of the second message(s) 620 at a maximum available transmit power and the second portion of the second message(s) at the second transmit power.

Figure 7:
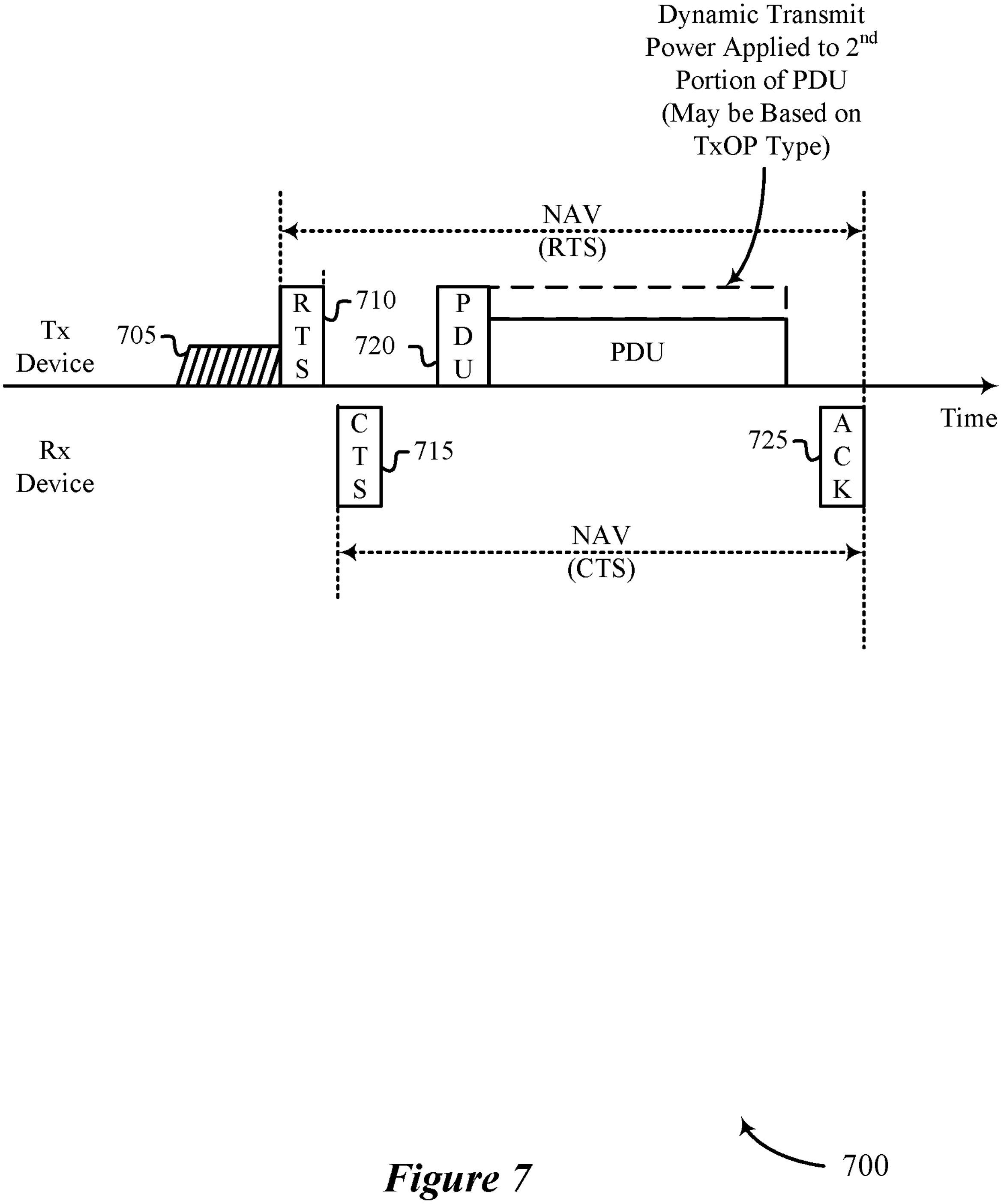
FIG. 7 shows an example of a signaling diagram that supports dynamic transmit power control.

FIG. 7 shows an example of a signaling diagram 700 that supports dynamic transmit power control. Signaling diagram 700 may implement aspects of implement or be implemented by aspects of WLAN 100, as shown and described with reference to FIG. 1. Signaling diagram 700 may implement or be implemented by aspects of signaling diagram 600. For example, aspects of signaling diagram 700 may be implemented at or implemented by a wireless device, which may be implementations of the corresponding devices described herein, such as an AP 102 or a STA 104 described with reference to FIG. 1. The AP(s) and STA(s) may be referred to herein as a wireless device, such as a transmitting device or a receiving device supporting dynamic transmit power control.

The transmitting device may contend for access to the channel by monitoring an energy level of the primary channel or by detecting an 802.11 signal preamble during one or more monitoring occasions 705. If the transmitting device determines that the channel is available, the transmitting device may transmit or otherwise provide a first message 710 on the channel indicating that the transmitting device has captured the channel for the TxOP and will transmit second message(s) during the TxOP. For example, the transmitting device may identify or otherwise determine that it has wireless communications to perform with a receiving device (such as a STA 104 discussed with reference to FIG. 1).

Accordingly, the first message 710 may carry or otherwise indicate resource allocation information for the TxOP on the channel. In some implementations, the first message 710 may be an initial control frame or other trigger frame. The first message 710 may be an example of the first message 610 discussed with reference to FIG. 6. The first message 710 may identify or otherwise indicate information for the resources associated with the TxOP. In some implementations, the first message 710 may be an example of an RTS frame, such as is shown in FIG. 7. For example, the transmitting device may configure the first message 710 to identify the duration of the TxOP, to indicate a NAV for its communications with the receiving device, available frequency resources for the TxOP, or other allocation information supporting the TxOP. The first message 710 may be sent in a non-HT duplicate PPDU format such that the receiving device may decode the PPDU on any channel within the bandwidth.

In some aspects, the transmitting device may transmit the first message 710 at the first transmit power (the $ITP_C$). The first transmit power may be the maximum available transmit power, which may be referred to as the first known initial transmit power in some implementations.

The receiving device may transmit or otherwise provide a response 715 to the first message. The response 715 may be an example of the response 615 discussed with reference to FIG. 6. The response 715 from the receiving device may be provided in a CTS frame. The response 715 may be carried or otherwise conveyed in a trigger-based PPDU, in some implementations. The response 715 from the receiving device may be provided on the channel associated with the TxOP.

In some implementations, the response 715 may be transmitted at a power level based on the first transmit power. The (MU-) RTS and CTS frame exchange may be performed at the known initial transmit power levels. For example, the response 715 to the first message 710 may be transmitted at the maximum available transmit power, such as the first transmit power.

The transmitting device may transmit the second message (s) 720 (e.g., PDU) to the receiving device according to the allocation information indicated in the first message 710. For example, the transmitting device may transmit data to the receiving device on the channel and during the TxOP. The second message(s) 720 may be an example of the second message(s) 620 discussed with reference to FIG. 6. In some implementations, the PDU session may include multiple messages exchanged between the transmitting device and the receiving device during the TxOP. The dynamic transmit power techniques discussed herein may be applied for the second message(s) 720 transmitted to the receiving device as well as being applied for one or more third messages transmitted by the receiving device to the transmitting device during the TxOP.

The receiving device may transmit or otherwise provide (and the transmitting device may receive or otherwise obtain) an ACK message 725 (an ACK frame) in response to transmitting the second message(s) 720. The ACK message 725 may be an example of the ACK message 625 discussed with reference to FIG. 6. The ACK frame may indicate information acknowledging or otherwise confirming receipt of the PDU. The ACK frame may be a block ACK frame indicating the status of PDU(s) (such as indicating a "1" for successful receipt or a "0" for failure) of each PDU within an aggregate PDU through a bitmap. The ACK frame may be provided via the channel and during the TxOP. The ACK frame may confirm that the receiving device has successfully received and decoded the data (the second message(s) 720).

The transmitting device may select or otherwise determine the second transmit power to use when transmitting the second message(s) 720 according to the techniques described herein. As discussed above and shown in FIG. 7, the dynamic transmit power techniques may be applied to some or all of the second message(s) 720. For example, the transmitting device may transmit the first portion of the second messages 720 (PHY header) at the first transmit power and then transmit the second portion of the second message(s) 720 at the second transmit power, which may be lower than the first transmit power. The dynamic transmit power transition between the PHY header and the payload may be based on TxOP differentiation.

In some implementations, application of the dynamic transmit power techniques may be based on the type of the TxOP. For example, the TxOP type may be a spatial reuse-protected TxOP or may be a NAV-protected TxOP. The transmitting device may select or otherwise identify the TxOP type for use in the transmitting the second message(s) 720 and select the second transmit power based on the TxOP type. In some implementations, the transmitting device may dynamically select between the different types of TxOPs by choosing the transmit power accordingly. For example, the transmitting device may select the second transmit power at a level that is greater for the spatial reuse-protected TxOP type than for the NAV-protected TxOP. The transmitting device may set one or more spatial reuse related fields in the first portion of the second message(s) 720 (such as in the PHY header of the PDU). This may indicate to the receiving device what the TxOP type is, which may be used for selecting the transmit power for its message transmissions during the TxOP.

In some implementations, the TxOP type may be selected by the transmitting device. That is, the TxOP holder (the transmitting device) may select the TxOP type and the corresponding transmit power to be applied.

In some implementations, the TxOP type may be selected be an AP, for example, and signaled to the transmitting devices. For example, the transmitting device may receive an indication of the TxOP type from the AP. The AP may choose the TxOP type based on target key performance indicators (KPIs) and may, in some implementations, coordinate with other APs in the selection.

In some implementations, the TxOP type may be dynamically switched by the AP and advertised to one (a specific STA), some (a subset of STAs), or all STAs. The AP may receive various channel performance indicators or other indications from the STAs and use this feedback when selecting the TxOP type. As one non-limiting example, the TxOP type may be selected based on the direction of the second message(s) 720 (either uplink or downlink). For example, uplink traffic may benefit from NAV-protection while downlink traffic may benefit from spatial reuse-protection.

Figure 8:
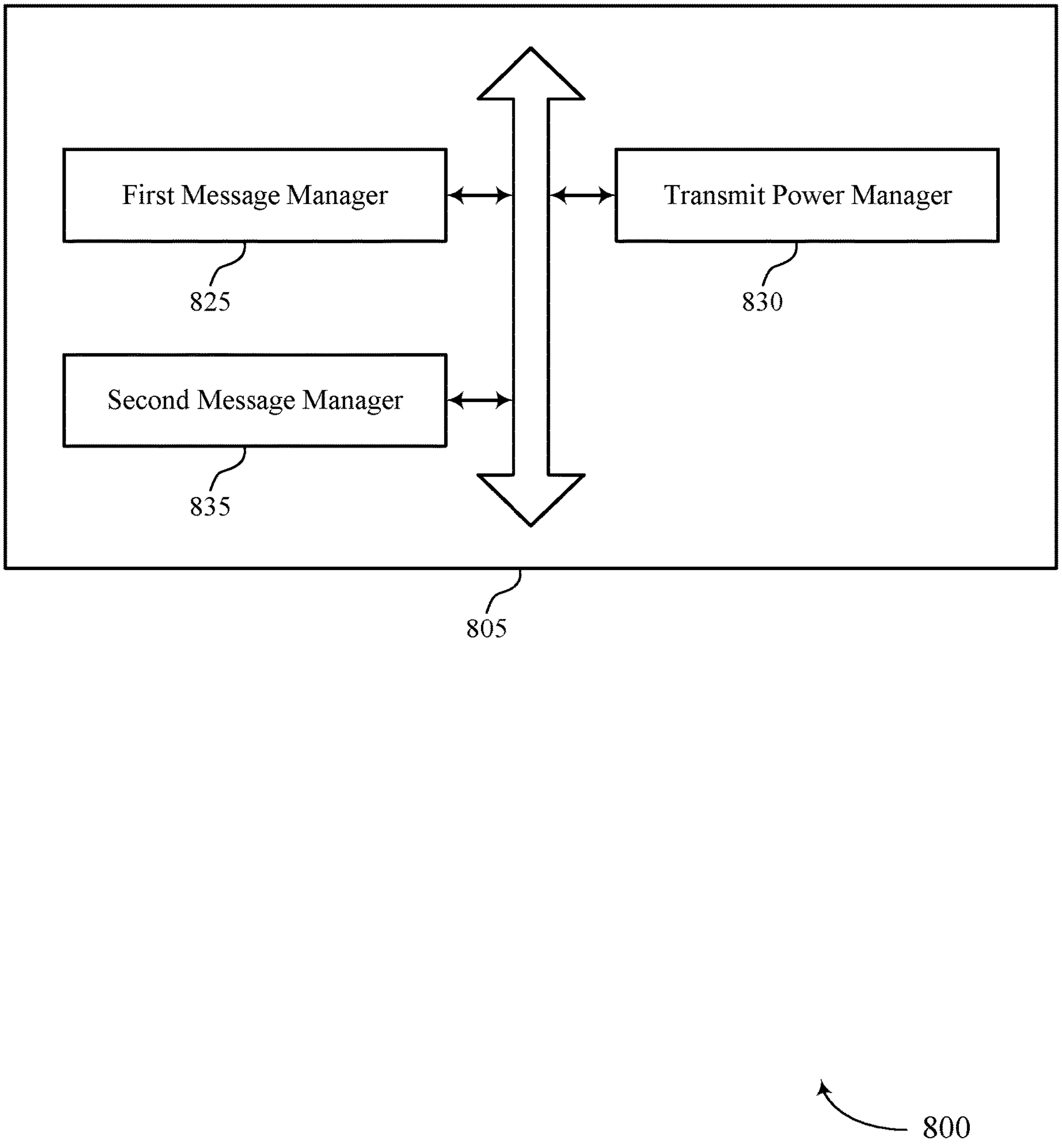
FIG. 8 shows a block diagram of an example wireless communication device that supports dynamic transmit power control.

FIG. 8 shows a block diagram of an example wireless communication device 800 that supports dynamic transmit power control. In some implementations, the wireless communication device 800 is configured to perform the process 900 described with reference to FIG. 9. The wireless communication device 800 may include one or more chips, SoCs, chipsets, packages, components or devices that individually or collectively constitute or include a processing system. The processing system may interface with other components of the wireless communication device 800, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 800 may transmit the information output from the chip. In such an example, the second interface may refer to an interface between the processing system of the chip and a reception component, such that the wireless communication device 800 may receive information that is then passed to the processing system. In some such examples, the first interface also may obtain information, such as from the transmission component, and the second interface also may output information, such as to the reception component.

The processing system of the wireless communication device 800 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some implementations, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some implementations, the wireless communication device 800 can configurable or configured for use in an AP or STA, such as the AP 102 or the STA 104 described with reference to FIG. 1. In some other examples, the wireless communication device 800 can be an AP or STA that includes such a processing system and other components including multiple antennas. The wireless communication device 800 is capable of transmitting and receiving wireless communications in the form of, for example, wireless packets. For example, the wireless communication device 800 can be configurable or configured to transmit and receive packets in the form of physical layer PPDUs and MPDUs conforming to one or more of the IEEE 802.11 family of wireless communication protocol standards. In some other examples, the wireless communication device 800 can be configurable or configured to transmit and receive signals and communications conforming to one or more 3GPP specifications including those for 5G NR or 6G. In some implementations, the wireless communication device 800 also includes or can be coupled with one or more application processors which may be further coupled with one or more other memories. In some implementations, the wireless communication device 800 further includes a user interface (UI) (such as a touchscreen or keypad) and a display, which may be integrated with the UI to form a touchscreen display that is coupled with the processing system. In some implementations, the wireless communication device 800 may further include one or more sensors such as, for example, one or more inertial sensors, accelerometers, temperature sensors, pressure sensors, or altitude sensors, that are coupled with the processing system. In some implementations, the wireless communication device 800 further includes at least one external network interface coupled with the processing system that enables communication with a core network or backhaul network that enables the wireless communication device 800 to gain access to external networks including the Internet.

The wireless communication device 800 includes a first message manager 825, a transmit power manager 830, and a second message manager 835. Portions of one or more of the first message manager 825, the transmit power manager 830, and the second message manager 835 may be implemented at least in part in hardware or firmware. For example, one or more of the first message manager 825, the transmit power manager 830, and the second message manager 835 may be implemented at least in part by at least a processor or a modem. In some implementations, portions of one or more of the first message manager 825, the transmit power manager 830, and the second message manager 835 may be implemented at least in part by a processor and software in the form of processor-executable code stored in memory.

The wireless communication device 800 may support wireless communications in accordance with examples as disclosed herein. The first message manager 825 is configurable or configured to transmit, at a first transmit power, a first message that indicates that the wireless device will transmit one or more second messages during a transmission opportunity. The second message manager 835 is configurable or configured to transmit the one or more second messages during the transmission opportunity at the second transmit power and in accordance with respective values of the set of multiple transmission parameters, wherein the second transmit power satisfies a metric for the one or more second messages.

In some implementations, the transmit power manager 830 is configurable or configured to select optimized values for one or more of the set of multiple transmission parameters, where the optimized values are in accordance with a wireless channel availability and an operating mode or capability of a receiving device for which the one or more second messages is intended. In some implementations, the transmit power manager 830 is configurable or configured to select the second transmit power after selection of the optimized values.

In some implementations, the transmit power manager 830 is configurable or configured to select optimized values for a combination of one or more of the set of multiple transmission parameters and the second transmit power, where the optimized values are optimized with respect to one or more of a minimum energy consumption, a spatial reuse opportunity, and protection of the transmission opportunity. In some implementations, the set of multiple transmission parameters include one or more of a MCS index, a NSS, a bandwidth, a PPDU type, a preamble puncturing mode, a coding scheme, a Doppler value, a guard interval, or a combination thereof. In some implementations, the metric be at least one of a target packet error rate, a target energy consumption, a spatial reuse opportunity, a transmit opportunity protection, or a combination thereof.

In some implementations, the transmit power manager 830 is configurable or configured to determine a minimum second transmit power in accordance with an energy consumption metric and the respective values of the set of multiple transmission parameters. In some implementations, the transmit power manager 830 is configurable or configured to select the second transmit power in accordance with the minimum second transmit power and a delta value.

In some implementations, the transmit power manager 830 is configurable or configured to select the second transmit power in accordance with a pathloss value for a channel between the wireless device and a receiving device that is to receive the one or more second messages.

In some implementations, the transmit power manager 830 is configurable or configured to measure the pathloss value between the wireless device and the receiving device. In some implementations, a distance between the wireless device and the receive device, a sounding procedure performed between the wireless device and the receiving device, a previous message exchange with the receiving device, a response to the first message received from the receiving device, or a combination thereof. In some implementations, the first transmit power be greater than the second transmit power.

In some implementations, to support transmitting the first message, the first message manager 825 is configurable or configured to participate in an exchange of an initial control frame with a first known initial transmit power and a control response frame with a second known initial transmit power, where the first transmit power is one of the first known initial transmit power or the second known initial transmit power.

In some implementations, values of the first known initial transmit power and the second known initial transmit power are exchanged between the wireless device and a receiving device in advance of selection of the second transmit power. In some implementations, selection of the second transmit power be in accordance with a pathloss value that is associated with at least one of the first known initial transmit power or the second known initial transmit power.

In some implementations, a value of the first known initial transmit power, the second known initial transmit power, or the second transmit power is expressed in terms of a combined transmit power at a transmit antenna connector of all antennas used by the wireless device to transmit the first message. In some implementations, the first transmit power be a maximum available transmit power and the second transmit power is less than the maximum available transmit power.

In some implementations, the second message manager 835 is configurable or configured to receive an acknowledgement message in response to transmitting the one or more second messages, where the acknowledgement message is associated with the first transmit power.

In some implementations, to support transmitting the one or more second messages during the transmission opportunity, the second message manager 835 is configurable or configured to transmit a first portion of the one or more second messages at a maximum available transmit power. In some implementations, to support transmitting the one or more second messages during the transmission opportunity, the second message manager 835 is configurable or configured to transmit a second portion of the one or more second messages at the second transmit power, the second transmit power being a lower power level than the maximum available transmit power.

In some implementations, the transmit power manager 830 is configurable or configured to select a transmission opportunity type for use in transmission of the one or more second messages. In some implementations, the transmit power manager 830 is configurable or configured to select the second transmit power based on the transmission opportunity type. In some implementations, the transmission opportunity type be one of a NAV-protected transmission opportunity or a SR-protected transmission opportunity. In some implementations, the second transmit power be greater for the SR-protected transmission opportunity than for the NAV-protected transmission opportunity. In some implementations, at least a portion of a physical header or preamble of the one or more second messages be sent using the first transmit power if the transmission opportunity type is the NAV-protected transmission opportunity.

In some implementations, the transmit power manager 830 is configurable or configured to indicate spatial reuse information in a PHY header of the one or more second messages in accordance with the transmission opportunity type. In some implementations, the transmission opportunity type for use in transmission of the one or more second messages be selected by the wireless device.

In some implementations, the transmit power manager 830 is configurable or configured to receive an indication of the transmission opportunity type from an AP, where selecting the second transmit power is in accordance with the transmission opportunity type.

In some implementations, the transmit power manager 830 is configurable or configured to select the transmission opportunity type in accordance with a transmission direction for the one or more second messages, where the transmission direction is one of uplink or downlink, wherein selecting the second transmit power is in accordance with the transmission opportunity type.

In some implementations, the transmit power manager 830 is configurable or configured to receive, from a receiving device receiving the one or more second messages, one or more third messages during the transmission opportunity at the second transmit power.

Figure 9:
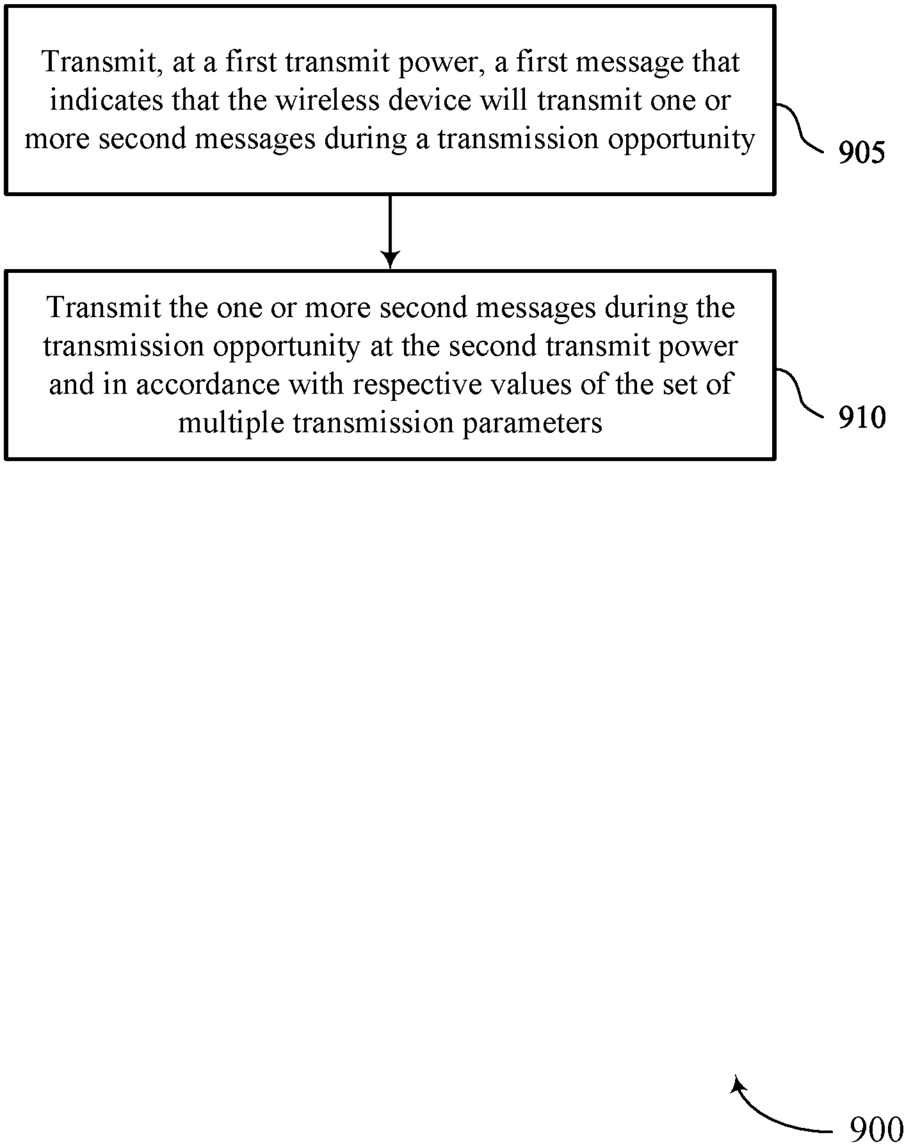
FIG. 9 shows a flowchart illustrating an example process performable by or at a wireless device that supports dynamic transmit power control.

FIG. 9 shows a flowchart illustrating an example process 900 performable by or at a wireless device that supports dynamic transmit power control. The operations of the process 900 may be implemented by a wireless device or its components as described herein. For example, the process 900 may be performed by a wireless communication device, such as the wireless communication device 800 described with reference to FIG. 8, operating as or within a wireless AP or a wireless STA. In some implementations, the process 900 may be performed by a wireless AP or a wireless STA, such as one of the APs 102 or the STAs 104 described with reference to FIG. 1.

In some implementations, in block 905, the wireless device may transmit, at a first transmit power, a first message that indicates that the wireless device will transmit one or more second messages during a transmission opportunity. The operations of block 905 may be performed in accordance with examples as disclosed herein. In some implementations, aspects of the operations of block 905 may be performed by a first message manager 825 as described with reference to FIG. 8.

In some implementations, in block 910, the wireless device may transmit the one or more second messages during the transmission opportunity at the second transmit power and in accordance with respective values of the set of multiple transmission parameters, where the second transmit power satisfies a metric for the one or more second messages. The operations of block 910 may be performed in accordance with examples as disclosed herein. In some implementations, aspects of the operations of block 910 may be performed by a second message manager 835 as described with reference to FIG. 8.

Implementation Examples are Described in the Following Numbered Clauses:

The Following Provides an Overview of Aspects of the Present Disclosure:

Aspect 1: A method for wireless communications at a wireless device, comprising: transmitting, at a first transmit power, a first message that indicates that the wireless device will transmit one or more second messages during a TxOP; and transmitting the one or more second messages during the TxOP at a second transmit power and in accordance with respective values of a plurality of transmission parameters, where the second transmit power satisfies a metric for the one or more second messages.

Aspect 2: The method of aspect 1, further comprising: selecting the second transmit power for the one or more second messages and the plurality of transmission parameters; selecting optimized values for one or more of the plurality of transmission parameters, where the optimized values are in accordance with a wireless channel availability and an operating mode or capability of a receiving device for which the one or more second messages is intended; and selecting the second transmit power after selection of the optimized values.

Aspect 3: The method of any of aspects 1-2, further comprising: selecting the second transmit power for the one or more second messages and the plurality of transmission parameters; and selecting optimized values for a combination of one or more of the plurality of transmission parameters and the second transmit power, where the optimized values are optimized with respect to one or more of a minimum energy consumption, a spatial reuse opportunity, and protection of the TxOP.

Aspect 4: The method of any of aspects 1-3, where the plurality of transmission parameters include one or more of a MCS index, a NSS, a BW, a PPDU type, a preamble puncturing mode, a coding scheme, a Doppler value, a guard interval, or a combination thereof.

Aspect 5: The method of any of aspects 1-4, where the metric is at least one of a target packet error rate, a target energy consumption, a spatial reuse opportunity, a transmit opportunity protection, or a combination thereof.

Aspect 6: The method of any of aspects 1-5, further comprising: selecting the second transmit power for the one or more second messages and the plurality of transmission parameters; determining a minimum second transmit power in accordance with an energy consumption metric and the respective values of the plurality of transmission parameters; and selecting the second transmit power in accordance with the minimum second transmit power and a delta value.

Aspect 7: The method of any of aspects 1-6, further comprising: selecting the second transmit power for the one or more second messages and the plurality of transmission parameters; and selecting the second transmit power in accordance with a pathloss value for a channel between the wireless device and a receiving device that is to receive the one or more second messages.

Aspect 8: The method of aspect 7, further including: measuring the pathloss value between the wireless device and the receiving device.

Aspect 9: The method of any of aspects 7-8, where the pathloss value is based on at least one of a distance between the wireless device and the receiving device, a sounding procedure performed between the wireless device and the receiving device, a previous message exchange with the receiving device, a response to the first message received from the receiving device, or a combination thereof.

Aspect 10: The method of any of aspects 1-9, where the first transmit power is greater than the second transmit power.

Aspect 11: The method of any of aspects 1-10, where transmitting the first message further includes: participating in an exchange of an initial control frame with a first known initial transmit power and a control response frame with a second known initial transmit power, where the first transmit power is one of the first known initial transmit power or the second known initial transmit power.

Aspect 12: The method of aspect 11, where values of the first known initial transmit power and the second known initial transmit power are exchanged between the wireless device and a receiving device in advance of selection of the second transmit power, and selection of the second transmit power is in accordance with a pathloss value that is associated with at least one of the first known initial transmit power or the second known initial transmit power.

Aspect 13: The method of any of aspects 11-12, where a value of the first known initial transmit power, the second known initial transmit power, or the second transmit power is expressed in terms of a combined transmit power at a transmit antenna connector of all antennas used by the wireless device to transmit the first message.

Aspect 14: The method of any of aspects 1-13, where the first transmit power is a maximum available transmit power and the second transmit power is less than the maximum available transmit power.

Aspect 15: The method of any of aspects 1-14, further comprising: receiving an acknowledgement message in response to transmitting the one or more second messages, where the acknowledgement message is associated with the first transmit power.

Aspect 16: The method of any of aspects 1-15, where transmitting the one or more second messages during the TxOP further includes: transmitting a first portion of the one or more second messages at a maximum available transmit power; and transmitting a second portion of the one or more second messages at the second transmit power, the second transmit power being a lower power level than the maximum available transmit power.

Aspect 17: The method of any of aspects 1-16, further comprising: selecting the second transmit power for the one or more second messages and the plurality of transmission parameters; select a TxOP type for use in transmission of the one or more second messages; and selecting the second transmit power based on the TxOP type.

Aspect 18: The method of aspect 17, where the TxOP type is one of a NAV-protected TxOP or a SR-protected TxOP.

Aspect 19: The method of aspect 18, where the second transmit power is greater for the SR-protected TxOP than for the NAV-protected TxOP.

Aspect 20: The method of any of aspects 18-19, where at least a portion of a physical header or preamble of the one or more second messages is sent using the first transmit power if the TxOP type is the NAV-protected TxOP.

Aspect 21: The method of any of aspects 17-20, further comprising: indicating spatial reuse information in a PHY header of the one or more second messages in accordance with the TxOP type.

Aspect 22: The method of any of aspects 17-21, where the TxOP type for use in transmission of the one or more second messages is selected by the wireless device.

Aspect 23: The method of any of aspects 17-22, further comprising: receiving an indication of the TxOP type from an AP, where selecting the TxOP type for use in transmission of the one or more second messages is in accordance with the indication.

Aspect 24: The method of any of aspects 17-23, further comprising: selecting the TxOP type in accordance with a transmission direction for the one or more second messages, where the transmission direction is one of uplink or downlink, where selecting the second transmit power for use in transmission of the one or more second messages is in accordance with the TxOP type.

Aspect 25: The method of any of aspects 1-24, further comprising: receiving, from a receiving device receiving the one or more second messages, one or more third messages during the TxOP at the second transmit power.

Aspect 26: A wireless device for wireless communications, comprising one or more memories storing processor-executable code, and one or more processors coupled with the one or more memories and individually or collectively operable to execute the code to cause the wireless device to perform a method of any of aspects 1-25.

Aspect 27: A wireless device for wireless communications, comprising at least one means for performing a method of any of aspects 1-25.

Aspect 28: A non-transitory computer-readable medium storing code for wireless communications, the code comprising instructions executable by a processor to perform a method of any of aspects 1-25.

As used herein, the term “determine” or “determining” encompasses a wide variety of actions and, therefore, “determining” can include calculating, computing, processing, deriving, estimating, investigating, looking up (such as via looking up in a table, a database, or another data structure), inferring, ascertaining, or measuring, among other possibilities. Also, “determining” can include receiving (such as receiving information), accessing (such as accessing data stored in memory) or transmitting (such as transmitting information), among other possibilities. Additionally, “determining” can include resolving, selecting, obtaining, choosing, establishing and other such similar actions.

As used herein, a phrase referring to “at least one of” or “one or more of” a list of items refers to any combination of those items, including single members. As an example, “at least one of: a, b, or c” is intended to cover: a, b, c, a-b, a-c, b-c, and a-b-c. As used herein, “or” is intended to be interpreted in the inclusive sense, unless otherwise explicitly indicated. For example, “a or b” may include a only, b only, or a combination of a and b. Furthermore, as used herein, a phrase referring to “a” or “an” element refers to one or more of such elements acting individually or collectively to perform the recited function(s). Additionally, a “set” refers to one or more items, and a “subset” refers to less than a whole set, but non-empty.

As used herein, “based on” is intended to be interpreted in the inclusive sense, unless otherwise explicitly indicated. For example, “based on” may be used interchangeably with “based at least in part on,” “associated with,” “in association with,” or “in accordance with” unless otherwise explicitly indicated. Specifically, unless a phrase refers to “based on only ‘a,’” or the equivalent in context, whatever it is that is “based on ‘a,’” or “based at least in part on ‘a,’” may be based on “a” alone or based on a combination of “a” and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless device, comprising:

a processing system that includes one or more processors and one or more memories coupled with the one or more processors, the processing system configured to cause the wireless device to:

transmit, at a first transmit power, a first message that reserves a channel for a transmission opportunity, wherein the first message indicates a duration of the transmission opportunity and indicates that the wireless device will transmit one or more second messages during the transmission opportunity; and transmit the one or more second messages during the transmission opportunity at a second transmit power and in accordance with respective values of a plurality of transmission parameters, wherein the second transmit power satisfies a threshold reliability metric based at least in part on one or more targets for the one or more second messages.

2. The wireless device of claim 1, wherein the processing system is further configured to cause the wireless device to:

select the second transmit power for the one or more second messages and the plurality of transmission parameters;

select optimized values for one or more of the plurality of transmission parameters, wherein the optimized values are in accordance with a wireless channel availability and an operating mode or capability of a receiving device for which the one or more second messages is intended; and select the second transmit power after selection of the optimized values.

3. The wireless device of claim 1, wherein the processing system is further configured to:

select the second transmit power for the one or more second messages and the plurality of transmission parameters; and select optimized values for a combination of one or more of the plurality of transmission parameters and the second transmit power, wherein the optimized values are optimized with respect to one or more of a minimum energy consumption, a spatial reuse opportunity, and protection of the transmission opportunity.

4. The wireless device of claim 1, wherein the plurality of transmission parameters include one or more of a modulation coding scheme (MCS) index, a number of spatial streams (NSS), a bandwidth (BW), a physical layer protocol data unit (PPDU) type, a preamble puncturing mode, a coding scheme, a Doppler value, a guard interval, or a combination thereof.

5. The wireless device of claim 1, wherein the one or more targets comprise at least one of a target packet error rate, a target energy consumption, a spatial reuse opportunity, a transmit opportunity protection, or a combination thereof.

6. The wireless device of claim 1, wherein the processing system is further configured to:

select the second transmit power for the one or more second messages and the plurality of transmission parameters;

determine a minimum second transmit power in accordance with an energy consumption metric and the respective values of the plurality of transmission parameters; and select the second transmit power in accordance with the minimum second transmit power and a delta value.

7. The wireless device of claim 1, wherein the processing system is further configured to:

select the second transmit power for the one or more second messages and the plurality of transmission parameters; and select the second transmit power in accordance with a pathloss value for a channel between the wireless device and a receiving device that is to receive the one or more second messages.

8. The wireless device of claim 7, wherein the processing system is further configured to cause the wireless device to:

measure the pathloss value between the wireless device and the receiving device.

9. The wireless device of claim 7, wherein a distance between the wireless device and the receiving device, a sounding procedure performed between the wireless device and the receiving device, a previous message exchange with the receiving device, a response to the first message received from the receiving device, or a combination thereof.

10. The wireless device of claim 1, wherein the first transmit power is greater than the second transmit power.

11. The wireless device of claim 1, wherein, to transmit the first message, the processing system is configured to cause the wireless device to:

participate in an exchange of an initial control frame with a first known initial transmit power and a control response frame with a second known initial transmit power, wherein the first transmit power is one of the first known initial transmit power or the second known initial transmit power.

12. The wireless device of claim 11, wherein:

values of the first known initial transmit power and the second known initial transmit power are exchanged between the wireless device and a receiving device in advance of selection of the second transmit power, and selection of the second transmit power is in accordance with a pathloss value that is associated with at least one of the first known initial transmit power or the second known initial transmit power.

13. The wireless device of claim 11, wherein a value of the first known initial transmit power, the second known initial transmit power, or the second transmit power is expressed in terms of a combined transmit power at a transmit antenna connector of all antennas used by the wireless device to transmit the first message.

14. The wireless device of claim 1, wherein the first transmit power is a maximum available transmit power and the second transmit power is less than the maximum available transmit power.

15. The wireless device of claim 1, wherein the processing system is further configured to cause the wireless device to:

receive an acknowledgement message in response to transmitting the one or more second messages, wherein the acknowledgement message is associated with the first transmit power.

16. The wireless device of claim 1, wherein, to transmit the one or more second messages during the transmission opportunity, the processing system is configured to cause the wireless device to:

transmit a first portion of the one or more second messages at a maximum available transmit power; and transmit a second portion of the one or more second messages at the second transmit power, the second transmit power being a lower power level than the maximum available transmit power.

17. The wireless device of claim 1, wherein the processing system is further configured to:

select the second transmit power for the one or more second messages and the plurality of transmission parameters;

select a transmission opportunity type for use in transmission of the one or more second messages; and select the second transmit power based on the transmission opportunity type.

18. The wireless device of claim 17, wherein the transmission opportunity type is one of a network allocation vector (NAV)-protected transmission opportunity or a spatial reuse (SR)-protected transmission opportunity.

19. The wireless device of claim 18, wherein the second transmit power is greater for the SR-protected transmission opportunity than for the NAV-protected transmission opportunity.

20. The wireless device of claim 18, wherein at least a portion of a physical header or preamble of the one or more second messages is sent using the first transmit power if the transmission opportunity type is the NAV-protected transmission opportunity.

21. The wireless device of claim 17, wherein the processing system is further configured to cause the wireless device to:

indicate spatial reuse information in a physical (PHY) header of the one or more second messages in accordance with the transmission opportunity type.

22. The wireless device of claim 17, wherein the transmission opportunity type for use in transmission of the one or more second messages is selected by the wireless device.

23. The wireless device of claim 17, wherein the processing system is further configured to:

receive an indication of the transmission opportunity type from an access point (AP), wherein selecting the transmission opportunity type for use in transmission of the one or more second messages is in accordance with the indication.

24. The wireless device of claim 17, wherein the processing system is further configured to:

select the transmission opportunity type in accordance with a transmission direction for the one or more second messages, wherein the transmission direction is one of uplink or downlink, wherein selecting the second transmit power for use in transmission of the one or more second messages is in accordance with the transmission opportunity type.

25. The wireless device of claim 1, wherein the processing system is further configured to cause the wireless device to:

receive, from a receiving device receiving the one or more second messages, one or more third messages during the transmission opportunity at the second transmit power.

26. A method for wireless communications at a wireless device, comprising:

transmitting, at a first transmit power, a first message that reserves a channel for a transmission opportunity, wherein the first message indicates a duration of the transmission opportunity and indicates that the wireless device will transmit one or more second messages during the transmission opportunity; and transmitting the one or more second messages during the transmission opportunity at a second transmit power and in accordance with respective values of a plurality of transmission parameters, wherein the second transmit power satisfies a threshold reliability metric based at least in part on one or more targets for the one or more second messages.

27. The method of claim 26, further comprising:

selecting optimized values for one or more of the plurality of transmission parameters, wherein the optimized values are in accordance with a wireless channel availability and an operating mode or capability of a receiving device for which the one or more second messages is intended; and selecting the second transmit power after selection of the optimized values.

28. The method of claim 26, further comprising:

selecting optimized values for a combination of one or more of the plurality of transmission parameters and the second transmit power, wherein the optimized values are optimized with respect to one or more of a minimum energy consumption, a spatial reuse opportunity, and protection of the transmission opportunity.

29. A wireless device for wireless communications, comprising:

means for transmitting, at a first transmit power, a first message that reserves a channel for a transmission opportunity, wherein the first message indicates a duration of the transmission opportunity and indicates that the wireless device will transmit one or more second messages during the transmission opportunity; and means for transmitting the one or more second messages during the transmission opportunity at a second transmit power and in accordance with respective values of a plurality of transmission parameters, wherein the second transmit power satisfies a threshold reliability metric based at least in part on one or more targets for the one or more second messages.

* * * * *